United States Patent  
Allam (10) Patent No.: US 10,746,461 B2
(45) Date of Patent: Aug. 18, 2020

(54) CRYOGENIC AIR SEPARATION METHOD FOR PRODUCING OXYGEN AT HIGH PRESSURES

(71) Applicant: 8 Rivers Capital, LLC, Durham, NC (US)

(72) Inventor: Rodney John Allam, Lanhill House (GB)

(73) Assignee: 8 Rivers Capital, LLC, Durham, NC (US)

( * ) Notice: Subject to any disclaimer, the term of this patent is extended or adjusted under 35 U.S.C. 154(b) by 197 days.

(21) Appl. No.: 15/689,532

(22) Filed: Aug. 29, 2017

(65) Prior Publication Data

US 2018/0073804 A1 Mar. 15, 2018

Related U.S. Application Data

(60) Provisional application No. 62/381,325, filed on Aug. 30, 2016.

(51) Int. Cl.
*F25J 3/04* (2006.01)
*F02C 3/34* (2006.01)
(Continued)

(52) U.S. Cl.
CPC .............. *F25J 3/0409* (2013.01); *F01K 13/00* (2013.01); *F01K 25/103* (2013.01); *F02C 3/22* (2013.01);
(Continued)

(58) Field of Classification Search
CPC .... F25J 3/04127; F25J 3/0409; F25J 3/04024; F25J 3/04193; F25J 3/04066; F25J 3/04157; F25J 3/04527; F25J 3/04533
See application file for complete search history.

(56) References Cited

U.S. PATENT DOCUMENTS 3,363,426 A * 1/1968 Stoklosinski ........ F25J 3/04066
62/510
3,731,495 A * 5/1973 Coveney ............... F01K 23/064
62/651

(Continued)

FOREIGN PATENT DOCUMENTS

EP 0042676 A1 * 12/1981 ............. F25J 3/0409
EP 0 930 268 7/1999

(Continued)

OTHER PUBLICATIONS

Research Disclosure, "Method for High Pressure Oxygen Production," Kenneth Mason Publications, Oct. 1, 2001, No. 450, pp. 1676-1678. XP001100122.

*Primary Examiner* — Nelson J Nieves
*Assistant Examiner* — Miguel A Diaz
(74) *Attorney, Agent, or Firm* — Womble Bond Dickinson (US) LLP (57) ABSTRACT

The present invention relates to a cryogenic air separation process that provides high pressure oxygen for an oxy-fired combustion of a fuel (e.g., a carbonaceous fuel). The air separation process can be directly integrated into a closed cycle power production process utilizing a working fluid, such as $CO_2$. Beneficially, the air separation process can eliminate the need for inter-cooling between air compression stages and rather provide for recycling the adiabatic heat of compression into a process step in further methods wherein an additional heat supply is beneficial.

13 Claims, 2 Drawing Sheets

(51) Int. Cl.
*F01K 13/00* (2006.01)
*F23L 7/00* (2006.01)
*F02C 3/22* (2006.01)
*F16T 1/00* (2006.01)
*F22B 35/12* (2006.01)
*F01K 25/10* (2006.01)

(52) U.S. Cl.
CPC .............. *F02C 3/34* (2013.01); *F16T 1/00* (2013.01); *F22B 35/12* (2013.01); *F23L 7/007* (2013.01); *F25J 3/04018* (2013.01); *F25J 3/04024* (2013.01); *F25J 3/04133* (2013.01); *F25J 3/04145* (2013.01); *F25J 3/04157* (2013.01); *F25J 3/04181* (2013.01); *F25J 3/04218* (2013.01); *F25J 3/04296* (2013.01); *F25J 3/04303* (2013.01); *F25J 3/04387* (2013.01); *F25J 3/04393* (2013.01); *F25J 3/04612* (2013.01); *F25J 3/04618* (2013.01); *F05D 2260/61* (2013.01); *F23L 2900/07006* (2013.01); *F25J 3/04412* (2013.01); *F25J 3/04533* (2013.01); *F25J 2205/32* (2013.01); *F25J 2205/34* (2013.01); *F25J 2205/70* (2013.01); *F25J 2230/06* (2013.01); *F25J 2240/10* (2013.01); *F25J 2240/70* (2013.01); *F25J 2250/04* (2013.01); *F25J 2260/80* (2013.01); *F25J 2290/12* (2013.01)

(56) References Cited

U.S. PATENT DOCUMENTS

| | | |
|---|---|---|
| 4,342,201 A | 8/1982 | Ishii |
| 4,461,154 A | 7/1984 | Allam |
| 4,806,136 A | 2/1989 | Kiersz et al. |
| 4,829,763 A | 5/1989 | Rao |
| 5,081,845 A | 1/1992 | Allam et al. |
| 5,355,681 A * | 10/1994 | Xu ................. F25J 3/04024 62/646 |
| 5,406,786 A | 4/1995 | Scharpf et al. |
| 5,651,271 A | 7/1997 | Fraysse et al. |
| 5,724,805 A | 3/1998 | Golomb et al. |
| 6,082,136 A * | 7/2000 | Yoshino ........... F25J 3/04024 62/652 |
| 6,117,916 A | 9/2000 | Allam et al. |
| 6,134,916 A | 10/2000 | Jahnke |
| 6,141,950 A | 11/2000 | Smith et al. |
| 6,178,775 B1 | 1/2001 | Higginbotham et al. |
| 6,256,994 B1 | 7/2001 | Dillon, IV |
| 6,263,659 B1 | 7/2001 | Dillon, IV et al. |
| 6,282,901 B1 | 9/2001 | Marin et al. |
| 6,345,517 B1 | 2/2002 | Jahnke |
| 6,360,561 B2 | 3/2002 | Allam et al. |
| 6,484,533 B1 | 11/2002 | Allam et al. |
| 6,568,185 B1 | 5/2003 | Marin et al. |
| 6,718,795 B2 | 4/2004 | Briglia |
| 6,745,573 B2 | 6/2004 | Marin et al. |
| 6,776,005 B2 | 8/2004 | Fuentes et al. |
| 6,945,052 B2 | 9/2005 | Frutschi et al. |
| 7,191,736 B2 | 3/2007 | Goldman |
| 7,827,794 B1 | 11/2010 | Pronske et al. |
| 7,966,829 B2 | 6/2011 | Finkenrath et al. |
| 8,065,879 B2 | 11/2011 | Brugerolle et al. |
| 10,295,254 B2 * | 5/2019 | Chakravarthy ...... F25J 3/04745 |
| 10,359,231 B2 * | 7/2019 | Degenstein .......... F25J 3/04296 |
| 10,408,536 B2 * | 9/2019 | Shelat ................. F25J 3/04872 |
| 2001/0042386 A1 | 11/2001 | Allam et al. |
| 2002/0029587 A1 * | 3/2002 | Pompl .................. F25J 3/0409 62/646 |
| 2002/0100293 A1 | 8/2002 | Prentice et al. |
| 2002/0170313 A1 * | 11/2002 | Zapp .................... F25J 3/0409 62/643 |
| 2004/0002030 A1 | 1/2004 | Shah et al. |
| 2004/0016237 A1 | 1/2004 | Marin et al. |
| 2004/0244594 A1 * | 12/2004 | Niclout .............. B01D 53/0462 96/128 |
| 2006/0010912 A1 * | 1/2006 | Brugerolle .......... F25J 3/04054 62/643 |
| 2006/0137393 A1 | 6/2006 | Bot |
| 2007/0204620 A1 | 9/2007 | Pronske et al. |
| 2007/0209389 A1 * | 9/2007 | Prosser ................ F25J 3/0409 62/643 |
| 2008/0034758 A1 | 2/2008 | Marin et al. |
| 2010/0024478 A1 * | 2/2010 | Corduan ............. F25J 3/0409 62/643 |
| 2011/0179799 A1 | 7/2011 | Allam |
| 2012/0237881 A1 * | 9/2012 | Allam ................. F25J 3/04018 431/2 |
| 2013/0104525 A1 * | 5/2013 | Allam ................. F25J 3/04018 60/273 |
| 2013/0213049 A1 * | 8/2013 | Allam ..................... F02C 3/20 60/773 |
| 2014/0093396 A1 * | 4/2014 | Stanko ................ F04D 27/0284 417/43 |
| 2014/0174123 A1 * | 6/2014 | Rauch ................. F25J 3/04824 62/643 |
| 2014/0283550 A1 * | 9/2014 | Bonne ................. F25J 3/04812 62/643 |
| 2014/0360201 A1 * | 12/2014 | Dubettier-Grenier .... F02C 3/28 60/775 |
| 2016/0356547 A1 * | 12/2016 | Goloubev ........... F25J 3/04024 |
| 2017/0131028 A1 * | 5/2017 | Goloubev ........... F25J 3/04345 |
| 2017/0211882 A1 * | 7/2017 | Alekseev ............ F25J 3/04084 |
| 2018/0003435 A1 * | 1/2018 | Kong .................. F25J 3/04848 |
| 2018/0180357 A1 * | 6/2018 | Golubev ............. F25J 3/04084 |
| 2018/0347900 A1 * | 12/2018 | Golubev .............. F25J 3/0406 |
| 2019/0368811 A1 * | 12/2019 | Zhao ................... F25J 3/04709 |
| 2020/0080773 A1 * | 3/2020 | Xu ...................... F25J 3/04775 |

FOREIGN PATENT DOCUMENTS

| | | |
|---|---|---|
| FR | 2 919 717 | 2/2009 |
| FR | 2 956 478 | 8/2011 |
| JP | S54-162678 | 12/1979 |
| JP | H10-267527 | 10/1998 |
| JP | H11-315727 | 11/1999 |
| WO | WO 2011/028322 | 3/2011 |

* cited by examiner

CRYOGENIC AIR SEPARATION METHOD FOR PRODUCING OXYGEN AT HIGH PRESSURES

CROSS-REFERENCE TO RELATED APPLICATIONS

The present application claims priority to U.S. Provisional Patent Application No. 62/381,325, filed Aug. 30, 2016, the disclosure of which is incorporated herein by reference.

FIELD OF THE INVENTION

The present invention is directed to methods and systems for producing a high pressure liquid oxygen stream. Particularly, the methods and systems can be used to provide a high pressure gaseous oxygen stream for use in a different or related method or system such as, for example, a power generation system.

BACKGROUND OF THE INVENTION

Systems and methods for power generation utilizing combustion of fossil fuel(s) with carbon dioxide as a working fluid are described in U.S. Pat. No. 8,596,075, which is incorporated by reference in its entirety herein. Such systems and methods utilize substantially pure oxygen for the combustion of the fossil fuel at high pressures (e.g., approximately 200 bar to 500 bar) and high temperatures. In some examples, the fossil fuel may be natural gas (i.e., hydrocarbon gas mixture consisting primarily of methane), and/or a fossil fuel derived from the partial oxidation of coal, biomass and/or residual petroleum refining products such as, for example, heavy residual oil fractions or petroleum coke. Regardless of the fossil fuel, highly pressurized gaseous oxygen is required in large quantities. Such systems and methods have been shown to provide increased efficiency through addition of heat to the power generator that is not recuperated from the combustion product stream. In one aspect, the added heat may be derived from adiabatic heat produced by compressors that increase the pressure of an inlet air stream in a cryogenic oxygen production process and/or from carbon dioxide recycling compressors.

Atmospheric air is recognized to comprise a number of different gaseous components, primarily nitrogen and oxygen, but also minor amounts of other materials, such as noble gases (predominantly argon), methane, water vapor, and carbon dioxide. One or more of the components of atmospheric air can be separated and provided in a purified form with an air separation method and system (i.e., an "air separation unit," "air separation plant," or "ASU"). There are various known technologies that are used for the air separation process, such as cryogenic distillation (e.g., a cryogenic air separation cycle), membrane separation, pressure swing adsorption (PSA), and vacuum pressure swing adsorption (VPSA) and separation of oxygen from air in a high temperature oxygen ion transport ceramic mixed oxide membrane system. Of the various available methods, cryogenic distillation is particularly advantageous for separating air into its constituent parts at high purity and high pressure.

A pumped liquid oxygen cycle is one exemplary cryogenic air separation cycle utilized for producing high pressure oxygen. For example, a pumped liquid oxygen cycle utilized for a cryogenic air separation cycle may include a liquid oxygen pump configured to deliver high pressure liquid oxygen through a heat exchanger so as to heat the high pressure liquid oxygen to ambient temperatures by cooling and/or condensing a complementary stream of high pressure air or nitrogen.

Although large scale oxygen production for industrial processes has been practiced for over 100 years, the highest oxygen pressures used up to now have only approached approximately 100 bar. Oxygen has been produced for high pressure gas cylinders at pressures of over 300 bar, but this production process for generally low flow rates utilizes small reciprocating pumps pumping liquid oxygen and then subsequently heating the liquid oxygen to ambient temperatures indirectly with an indirectly heated heat exchanger, for example using heat supplied externally from ambient air or hot water. Accordingly, there remains a need in the art for further systems and methods for production of high pressure oxygen, such as suitable for use as an oxidant in a power production system and method.

SUMMARY OF THE INVENTION

The present invention, in various aspects, relates to a cryogenic air separation process that is useful for producing a high pressure oxygen stream for use in one or more further processes such as, for example, a power generation system incorporating oxy-fired combustion of a fuel. The produced oxygen preferably is in a gaseous or supercritical state. In particular, such combustion may be performed in a closed cycle power generation process using a working fluid such as, for example, a $CO_2$ working fluid. The air separation process according to various aspects of the present disclosure may be characterized by a number of specific advantages. For example, the air separation process may advantageously provide a low cost process for producing ambient temperature oxygen at pressures from approximately 200 bar to approximately 500 bar utilizing a high efficiency pumped liquid oxygen cycle in a cryogenic air separation process. In some aspects, the cryogenic air separation process may be incorporated with an adiabatic air compressor so as to integrate the air separation unit with a power generation system. According to another aspect of the present disclosure, the process may include utilizing an arrangement of the expansion portions of expansion turbines of high pressure air feed streams that are integrated with a high pressure compact heat exchanger so as to provide for an optimal heat exchange area and overall optimal cycle efficiency based on overall oxygen cost.

According to one aspect, the system and method may provide for producing two separate streams of oxygen from a cryogenic air separation cycle at two distinct pressures. A first stream of oxygen may be utilized for the production of oxygen at pressures ranging from approximately 200 bar to approximately 500 bar for use in a combustor of a power generation system. According to some aspects, a second stream of oxygen may be utilized for the production of oxygen at pressures ranging from approximately 30 bar to approximately 150 bar for use in a heavy fuel partial oxidation reactor configured to produce a fuel gas stream to be used in the combustor of a power generation system.

In some aspects, the system and method may provide for the utilization of waste heat from a carbon dioxide recycle compression process in a power generation system so as to provide the desired heating of a reactivation nitrogen stream utilized in a front end adsorber air purification unit included in a cryogenic air separation unit.

In some aspects, the present disclosure can relate to an air separation method for suitable for producing purified, high pressure oxygen. For example, such methods can comprise any combination of the following steps: separating a partially liquefied air stream into at least a product liquid oxygen stream and a low pressure nitrogen stream in a Linde double column distillation system; increasing the pressure of the liquid oxygen to between about 200 bar and 500 bar in a liquid oxygen pump; compressing an inlet air stream in a first air compressor to a pressure of at least 5 bar; passing the pressurized inlet air stream through a first heat exchanger so as to transfer at least a portion of adiabatic heat produced by compressing the inlet air stream to heat a working fluid stream of a power cycle; cooling the pressurized air stream in a direct water-cooled packed tower; passing the cooled pressurized air stream through an adsorption system so as to produce a purified cooled pressurized air stream; dividing the purified cooled pressurized air stream into a first purified pressurized air stream and a second purified pressurized air stream; cooling the second purified pressurized air stream to a temperature near its liquefaction temperature in the low pressure heat exchanger which heats a portion of the low pressure nitrogen stream from the low pressure distillation column to near ambient temperature; feeding the cooled second purified pressurized air stream into the bottom section of the high pressure distillation column; dividing the first purified pressurized air stream into two parts; compressing the first portion of the first purified pressurized air stream to produce a first high pressure purified air stream at a pressure of between about 80 bar and 125 bar; compressing a second portion of the first purified pressurized air stream to produce a second high pressure purified air stream at a pressure of between about 50 bar and 80 bar; cooling the first high pressure purified air stream and the second high pressure purified air stream in a high pressure heat exchanger which heats the high pressure liquid oxygen stream and the remaining portion of the low pressure nitrogen stream to near ambient temperature; further cooling the second high pressure purified air stream to a temperature between about −80° C. and −120° C. in the high pressure heat exchangers; removing the entire second high pressure purified air stream from the high pressure heat exchanger and expanding it in a first power producing turbine to the pressure of the high pressure distillation column and feeding the total discharge stream into the lower section of the high pressure column; withdrawing a portion of the first portion of the first high pressure purified air stream from the high pressure heat exchanger at a temperature between about −20° C. and −40° C. and expanding it in a second power producing turbine to the pressure of the low pressure distillation column and feeding the total discharge stream into the low pressure column at a point near to the crude oxygen feed point; removing the remaining portion of the first portion of the first high pressure purified air stream from the outlet of the high pressure heat exchanger at a temperature between −160° C. and −170° C.; further cooling the remaining portion of the first portion of the first high pressure purified air stream by 5° C. and 10° C. against the whole waste nitrogen stream in a high pressure subcooler; and expanding the cooled remaining portion of the first portion of the first high pressure purified air stream output from the high pressure subcooler in a third power producing turbine to the pressure of the high pressure distillation column and feeding the total discharge flow into the lower section of the high pressure column.

In one or more embodiments, a method for producing oxygen according to the present disclosure can comprise the following steps: compressing an inlet air stream in a first compressor to form a compressed inlet air stream with a pressure of at least 3.5 bar and a temperature of greater than 150° C.; cooling the compressed inlet air stream to a temperature of less than 25° C.; purifying the compressed inlet air stream by removing at least 90 mol % of any carbon dioxide and water present in the compressed inlet air stream and thus forming a purified inlet air stream; dividing the purified inlet air stream into a first portion and a second portion; further compressing the first portion of the purified inlet air stream to form an intermediate pressure, purified air stream having a pressure of about 20 bar to about 90 bar and a high pressure, purified air stream having a pressure of about 70 bar to about 150 bar, the high pressure, purified air stream having a pressure that is greater than the pressure of the intermediate pressure, purified air stream; cooling the intermediate pressure, purified air stream and the high pressure, purified air stream in a heat exchanger; expanding a first fraction of the high pressure, purified air stream in a first power producing turbine to form a first expanded, purified air stream; expanding a second fraction of the high pressure, purified air stream in a second power producing turbine to form a second, expanded, purified air stream; expanding the intermediate pressure, purified air stream in a third power producing turbine to form a third expanded, purified air stream; passing the first expanded, purified air stream, the second, expanded, purified air stream, the third, expanded, purified air stream, and the second portion of the purified inlet air stream through a distillation column and to form an exit stream of substantially pure liquid oxygen and a waste stream comprising nitrogen; compressing the exit stream of substantially pure liquid oxygen to a pressure of greater than 150 bar; and heating the exit stream of substantially pure liquid oxygen to a temperature of greater than −10° C. in the heat exchanger against the intermediate pressure, purified air stream and the high pressure, purified air stream to form an exit stream of substantially pure high pressure oxygen gas.

In further embodiments, the method may be defined in relation to any one or more of the following statements, which may be combined in any number and order.

Cooling the compressed inlet air stream can comprise transferring heat from the compressed inlet air stream to a working fluid stream from a power producing cycle.

The compressed inlet air stream can be cooled to a first reduced temperature by transferring heat from the compressed inlet air stream to the working fluid stream from the power producing cycle, and the compressed inlet air stream can be cooled to a second, further reduced temperature against a cooling water stream.

The purifying can comprise passing the compressed inlet air stream through a dual bed adsorption system.

The first portion of the purified inlet air stream can comprise about 25 mol % to about 75 mol % of the purified inlet air stream.

The intermediate pressure, purified air stream can comprise about 30 mol % to about 50 mol % of the first portion of the purified inlet air stream, and the high pressure, purified air stream comprises about 70 mol % to about 50 mol % of the first portion of the purified inlet air stream.

The method can comprise cooling the second portion of the purified inlet air stream against a portion of the waste stream comprising nitrogen before passing the second portion of the purified inlet air stream through the distillation column.

The first fraction of the high pressure, purified air stream to be expanded in the first power producing turbine can be withdrawn from the heat exchanger at a temperature range of about −20 to about −40° C.

The second fraction of the high pressure, purified air stream to be expanded in the second power producing turbine can be withdrawn from the heat exchanger at a temperature range of about −160 to about −170° C.

The intermediate pressure, purified air stream to be expanded in the third power producing turbine can be withdrawn from the heat exchanger at a temperature range of about −80 to about −120° C.

The distillation column can comprise a double column distillation system.

The exit stream of substantially pure liquid oxygen can be compressed to a pressure of about 200 bar to about 500 bar.

In another aspect, a power generation system may comprise an integrated air separation process providing a high pressure gaseous oxygen stream configured to be used in power generation. More specifically, a power generation process may comprise the following steps: introducing a fuel, $O_2$, and a circulating $CO_2$ working fluid into a combustor; combusting the fuel to provide a combustion product stream comprising the working fluid; expanding the combustion product stream across a turbine to generate power; withdrawing heat from the turbine discharge stream by passing the turbine discharge stream through a primary heat exchange unit to provide a cooled turbine discharge stream; removing from the cooled turbine discharge stream one or more secondary components that are present in the cooled turbine discharge stream in addition to the working fluid to provide a purified, cooled turbine discharge stream, at least a majority of which is the working fluid; compressing the working fluid in a compressor system; withdrawing a compressed $CO_2$ stream containing the carbon present in the fuel; passing the working fluid through the same primary heat exchange unit such that the withdrawn heat is used to increase the temperature of the working fluid; supplying an additional quantity of externally generated heat to the working fluid (preferably at a moderate temperature level, such as approximately 400° C.); and recycling the working fluid into the combustor.

In particular, the integrated air separation process can comprise the following steps: pressurizing air in first and second air compressors that are operated with uncooled sections having pressure ratios from 2.5 to 12; transferring at least a portion of the adiabatic heat of compression of the pressurized air from the un-cooled sections to a circulating $CO_2$ working fluid stream, the transferred heat comprising at least a portion of the additional quantity of heat that is supplied to the working fluid in the power production process; cryogenically cooling the purified pressurized air against product $O_2$ and $N_2$ streams; separating the air in one or more distillation columns to form a liquid $O_2$ stream and nitrogen streams; pumping the liquid $O_2$ stream to provide at least a portion of the $O_2$ that is introduced into the combustor.

In further embodiments, a method for producing power can comprise the following steps: combusting a fuel with a stream of substantially pure high pressure oxygen gas in a combustor in the presence of a recycle $CO_2$ working fluid stream to form a combustion product stream including $CO_2$ at a pressure of greater than 150 bar; expanding the combustion product stream including $CO_2$ across a turbine to form a turbine exhaust stream and generate power; removing heat from the turbine exhaust stream in a recuperator heat exchanger; separating $CO_2$ from the turbine exhaust stream to form the recycle $CO_2$ working fluid stream; compressing the recycle $CO_2$ working fluid stream; heating at least a portion of the recycle $CO_2$ working fluid stream using the heat removed from the turbine exhaust stream in the recuperator heat exchanger and also heating at least a portion of the recycle $CO_2$ working fluid stream using added heating; passing the recycle $CO_2$ working fluid stream from the recuperator heat exchanger to the combustor; and forming the stream of substantially pure high pressure oxygen gas by a method wherein: an inlet air stream is compressed in a first compressor to form a compressed inlet air stream with a pressure of at least 3.5 bar and a temperature of greater than 150° C.; heat from the compressed inlet air stream is used as the added heating for heating at least a portion of the recycle $CO_2$ working fluid stream so that the compressed inlet air stream is cooled; the compressed inlet air stream is purified to form a purified inlet air stream; the purified inlet air stream is divided into a first portion and a second portion; the first portion of the purified inlet air stream is compressed to form an intermediate pressure, purified air stream having a pressure of about 20 bar to about 90 bar and a high pressure, purified air stream having a pressure of about 70 bar to about 150 bar, the high pressure, purified air stream having a pressure that is greater than the pressure of the intermediate pressure, purified air stream; the intermediate pressure, purified air stream and the high pressure, purified air stream are cooled in a heat exchanger; a first fraction of the high pressure, purified air stream is expanded in a first power producing turbine to form a first expanded, purified air stream; a second fraction of the high pressure, purified air stream in expanded in a second power producing turbine to form a second, expanded, purified air stream; the intermediate pressure, purified air stream is expanded in a third power producing turbine to form a third expanded, purified air stream; the first expanded, purified air stream, the second, expanded, purified air stream, the third, expanded, purified air stream, and the second portion of the purified inlet air stream are passed through a distillation column and to form an exit stream of substantially pure liquid oxygen and a waste stream comprising nitrogen; the exit stream of substantially pure liquid oxygen is compressed to a pressure of greater than 150 bar; and the exit stream of substantially pure liquid oxygen is heated to a temperature of greater than −10° C. in the heat exchanger against the intermediate pressure, purified air stream and the high pressure, purified air stream to form the substantially pure high pressure oxygen gas.

DETAILED DESCRIPTION

Some aspects of the present disclosure will now be described more fully hereinafter with reference to the accompanying drawings, in which some, but not all implementations of the disclosure are shown. Indeed, various implementations of the disclosure may be expressed in many different forms and should not be construed as limited to the implementations set forth herein; rather, these exemplary implementations are provided so that this disclosure will be thorough and complete, and will fully convey the scope of the disclosure to those skilled in the art. For example, unless otherwise indicated, something being described as being a first, second or the like should not be construed to imply a particular order. Also, something may be described as being above something else (unless otherwise indicated) may instead be below, and vice versa; and similarly, something described as being to the left of something else may instead be to the right, and vice versa. As used in the specification, and in the appended claims, the singular forms "a", "an", "the", include plural referents unless the context clearly dictates otherwise. Like reference numerals refer to like elements throughout.

Aspects of the present disclosure relate to an air separation process for producing oxygen at high pressures. According to another aspect, a system and method may provide a high pressure gaseous oxygen stream for a power generation process. In some aspects, a power generation system may typically require approximately between 11 to 12 metric tons per day (MT/D) of oxygen flow per megawatt (MW) of installed net electrical output. For example, a 300 MW natural gas power generation system using $CO_2$ as the working fluid would be expected to require approximately 3500 MT/D of oxygen flow under typical operational conditions. In some aspects, a combustor that is integrated with a $CO_2$ power turbine utilizes a mixture of 25 mol % pure $O_2$ and 75% $CO_2$ as the oxidant medium. This dilution of the pure $O_2$ ensures that reasonably moderate combustion temperatures are obtained, and the dilution is consistent with the low carbon monoxide levels following combustion and low excess oxygen requirement. The necessary mixed gas (i.e., gas mixture of $CO_2$ and $O_2$) must be produced at the turbine inlet pressure in the range of approximately 200 bar to approximately 500 bar. In addition, according to some aspects, the mixed gas may be preheated, at a high pressure, in a $CO_2$ recycle economizer heat exchanger to a temperature ranging from approximately 600° C. to 800° C. If $O_2$ is produced at conventional pressure levels of up to 100 bar, then the low pressure $O_2$ must be mixed with $CO_2$ at the same low pressure and then be subsequently compressed to the required combustion pressure in a separate $CO_2$ compression train, which may typically include a $CO_2+O_2$ gas compressor, and a water cooled heat exchanger producing a single phase dense $CO_2+O_2$ mixture followed by a high pressure pump. Further, the $CO_2+O_2$ gas compressor requires a discharge pressure over approximately 150 bar. The exact discharge pressure would depend on the temperature of the cooling water used to cool the mixed stream to a temperature at which the $CO_2+O_2$ gas mixture is above its critical pressure. The critical pressure of the $CO_2+O_2$ gas mixture is elevated compared to a pure $CO_2$ gas.

As previously mentioned, aspects of the present disclosure may provide significant advantages by producing high pressure $O_2$ having a pressure ranging from approximately 200 bar to 500 bar at the required flow rates that are large enough for electric power production using a power generation process. The presently disclosed systems and methods are particularly configured for providing oxygen at required flow rates for use in a power production system and method and at pressures of at least 150 bar, at least 180 bar, or at least 200 bar (e.g., with a maximum of about 600 bar in some embodiments). More particularly, oxygen can be produced at pressures of about 150 bar to about 600 bar, about 180 bar to about 550 bar, or about 200 bar to about 500 bar.

According to one aspect of a power production cycle utilizing an oxygen preparation system and method as described herein, the $CO_2+O_2$ compressor train plus the pump may be eliminated. In another example aspect, an air separation unit may be installed proximate to the turbine and economizer heat exchanger so as to facilitate the integration of the desirable heat from the air compressor. Additionally, disposing the air separation unit proximate to the turbine and economizer heat exchanger may advantageously provide for high pressure oxygen delivery lines that have shorter lengths and/or smaller diameters.

In order to produce $O_2$ at a pressure as described herein, according to one aspect, the system utilizes a conventional cryogenic air distillation system that includes a double column system such as, for example, a Linde® double column system. The double column system may include a bottom portion which operates at pressures of approximately 5.4 bar (i.e., a high pressure column) so as to separate an air feed which is partially liquid into a gaseous nitrogen stream and oxygen enriched liquid stream. The high pressure, bottom column can operate at a pressure of at least 2.5 bar, at least 3 bar, or at least 5 bar, such as about 3 bar to about 50 bar, about 3.5 bar to about 10 bar, or about 4 bar to about 8 bar. In some aspects, the nitrogen stream may leave the top of the high pressure column and may be condensed in a heat exchanger placed above the liquid level in the sump of a top portion of the double column system (i.e., a low pressure column), which in some aspects, may operate at a pressure of approximately 1.3 bar. The low pressure, top column can operate at a pressure of less than 2.5 bar or less than 2 bar, such as 1 bar to about 2.4 bar, about 1 bar to about 2.2 bar, or about 1 bar to about 2 bar.

The total liquid $O_2$ stream leaving the bottom distillation section of the low pressure column moves downwardly and passes through a re-boiler condenser where a portion of the liquid $O_2$ stream vaporizes and the remaining portion of the liquid $O_2$ stream collects in the sump of the low pressure column. The liquid $N_2$ formed in the reboiler condenser by condensation of nitrogen gas leaving the top distillation section of the high pressure column is used as a reflux in both the low pressure column and the high pressure column of the double column system. The oxygen enriched liquid stream leaving the base of the high pressure column is provided proximate the midpoint of the low pressure column. Both the reflux nitrogen stream and the enriched liquid oxygen stream pass through a sub-cooler utilizing waste nitrogen exiting from the top of the lower pressure column so as to be sub-cooled below their respective saturation temperatures before being reduced in pressure in valves to minimize vapor production. According to one aspect, the lower section of the low pressure column enriches the oxygen to a desirable purity for optimum efficiency when utilized in a power generation process. For example, the purity of the oxygen stream prepared according to the present disclosure can be greater than 98% $O_2$, greater than 99% $O_2$, or greater than 99.5% $O_2$ (mol %) to reduce the concentration of inert argon in the circulating recycle $CO_2$ stream and the net $CO_2$ product stream, which is fixed by the ratio of oxygen to carbon in the total fuel feed to the power system. The restriction of a minimum oxygen purity of 98% (molar) is specifically targeted at the integration of the oxygen plant with a power system which is characterized by a need to limit the quantity of inert argon or nitrogen in a closed cycle using $CO_2$ as the working fluid. Other oxy-fuel cycles may not have this restriction and therefore may use oxygen purities below the minimum 98% molar considered herein. It should be recognized that in this case, with lower oxygen purities, the minimum discharge pressure for the main air compressor could be as low as 3.5 bar. According to one aspect, a desirable characteristic for a pumped liquid oxygen system is the ability to withdraw the total product oxygen stream as liquid oxygen from the sump of the low pressure column and to deliver the liquid oxygen stream at a required pressure using a multi-stage centrifugal or reciprocating oxygen pump. As one of ordinary skill in the art can appreciate, more complex distillation arrangements are possible that may include provision for separate argon and/or pure gas extraction, multiple re-boilers, and/or multiple linked column arrangements.

Some complications that are addressed by aspects of the present disclosure can include efficiently heating the liquid oxygen stream, which may have a substantially high pressure as otherwise described herein, to near ambient temperature and providing a large quantity of very low temperature refrigeration required for achieving an overall heat balance around the plant. Accordingly, one aspect of the present disclosure advantageously includes the utilization of a first air compressor which compresses the total air flow required to produce the oxygen stream to a pressure of about 2 bar or greater, about 3.5 bar or greater, or about 5 bar or greater (e.g., up to a maximum of about 50 bar in some embodiments). In certain embodiments, the compressor may compress the total air flow to an initial pressure of about 2 bar to about 20 bar, about 3.5 bar to about 15 bar, about 4 bar to about 10 bar, or about 5 bar to about 6 bar. The inlet air stream compressed to such pressure range can be defined herein as a low pressure stream (i.e., indicating that the stream is pressurized but is at a low pressure relative to other streams as described herein). This air compressor is advantageously configured as an adiabatic air compressor with no inter-cooling between stages. Its outlet temperature will preferably be above 150° C. and more preferably will be above 200° C. (e.g., with a maximum in some embodiments of about 600° C.). For example, the outlet temperature can be about 160° C. to about 500° C., about 190° C. to about 400° C., or about 210° C. to about 350° C.

The hot discharge air stream is cooled either directly or indirectly, and the heat of compression can be transferred to the closed cycle $CO_2$ power system providing at least part of the externally generated heat which increases the efficiency of the power system. The low pressure stream of compressed inlet air can transfer a sufficient amount of heat to the power production cycle so that the low pressure stream of compressed inlet air is reduced to a temperature of less than 100° C., less than 80° C., or less than 70° C., such as about 30° C. to about 100° C., about 35° C. to about 90° C., or about 40° C. to about 80° C. The compressed cooled air stream is then cooled to below ambient temperature against an ambient cooling means such as, for example, cooling water and/or against a stream of chilled water whose temperature has been reduced by direct contact with the stream of preferably water free waste nitrogen vented from the air separation plant. The thus produced stream of low pressure inlet air can be at a temperature of less than 25° C., less than 20° C., less than 15° C., or less than 10° C., such as about −10° C. to about 20° C., about −5° C. to about 15° C., or about 0° C. to about 10° C.

The cooled compressed total air flow is then passed through an air purification system. In some embodiments, a suitable purification system comprises switching vessels filled with solid pelletized adsorbent, which removes water, $CO_2$ and trace hydrocarbons from the air stream before it is cooled in the air separation plant to its liquefaction temperature. Other purification systems likewise are encompassed for use according to the present disclosure. The purification system preferably is adapted to remove at least a portion of any $CO_2$ and/or any water and/or any hydrocarbons present in the inlet air stream. For example, any one or more of $CO_2$, water, or hydrocarbons may be reduced by at least 75 mol %, at least 90 mol %, at least 95 mol %, or at least 99 mol % relative to the amount present in the initial inlet air stream. The purified air stream thus can be substantially free of any one or more of $CO_2$, water, or hydrocarbons (or any further impurity that may desirably be removed, such as NOx, CO, or the like that may be reasonably expected to be present in ambient air). In such context, substantially free can mean having less than 1 mol %, less than 0.5 mol %, or less than 0.1 mol % of the noted material present in the purified air stream.

The purified air stream can be divided into to two or more portions. The divided portions of the purified air stream can be further compressed or remain at substantially the same pressure to which the inlet air stream is originally compressed. The purified air stream can be divided substantially equally, or one portion may contain a greater ratio of the purified air stream.

At least part of the purified air stream is compressed in at least air compressor. For example, one or more compressors can be configured to compress a first portion of the purified air stream that comprises about 10 mol % to about 90 mol %, about 25 mol % to about 75 mol %, or about 35 mol % to about 50 mol % of the total air flow leaving the purification system. In an exemplary embodiment, a first air compressor can compress the first portion of the purified air stream to a pressure of about 20 bar to about 90 bar, about 35 bar to about 85 bar, or about 50 bar to about 80 bar. The air stream at such pressure range can be defined as an intermediate pressure air stream. An amount of the intermediate pressure compressed air accounting for approximately 30 mol % to about 50 mol % of the first portion of the purified air can be passed to a heat exchanger as discussed. An amount of the intermediate pressure compressed air accounting for approximately 70 mol % to about 50 mol % of the first portion of the purified air can be passed to a second air compressor for compression up to a pressure of about 70 bar to about 150 bar, about 75 bar to about 140 bar, or about 80 bar to about 125 bar. This further compressed amount of the first portion of the purified air can be defined as a high pressure air stream.

While the relative terms "low pressure air stream," "intermediate pressure air stream," and "high pressure air stream" are used herein, it is understood that the relative terms are bounded by the pressure ranges noted herein.

The intermediate pressure, purified air stream and the high pressure, purified air stream formed from the first portion of the purified pressurized cooled air streams (having been heated during passage through the high pressure air compressors) are passed through a high pressure heat exchanger where the intermediate pressure, purified air stream and the high pressure, purified air stream transfer heat to a high pressure liquid oxygen stream leaving the multi-stage centrifugal or reciprocating oxygen pump to heat the pressurized oxygen stream to near ambient temperature in an efficient manner with minimum temperature difference between the heating and cooling streams.

In some embodiments, all of the purified air stream may be pressurized to form the intermediate pressure, purified air stream and the high pressure, purified air stream. According to another aspect, a second portion of the purified pressurized cooled air stream may be cooled in a low pressure heat exchanger. The second portion of the purified pressurized cooled air stream can still be a low pressure air stream (i.e., still being in the pressure range in which the inlet air stream was originally compressed), and the second portion can comprise about 10 mol % to about 90 mol %, about 25 mol % to about 75 mol %, or about 50 mol % to about 65 mol % of the total air flow leaving the purification system. The second portion can be cooled in the low pressure heat exchanger to approximately the liquefaction temperature of the purified air stream while heating a portion of the waste nitrogen from the top of the low pressure distillation column to near ambient temperature. The cooled air stream then enters the base of the high pressure distillation column as part of the air feed. The remaining portion of the waste nitrogen stream may be heated in the high pressure air/oxygen heat exchanger. The fractional split between these two heat exchangers for the waste nitrogen stream is fixed by the need to achieve minimum outlet air temperatures in the low pressure heat exchanger and the high pressure heat exchanger together with the lowest economic temperature differences between the cooling and heating streams.

In some aspects, expansion turbines may provide the desired large quantity of very low temperature level refrigeration for producing the highly purified, high pressure gaseous oxygen product stream. A first expansion turbine may be configured to expand part of the first purified cooled pressurized air stream from the high pressure air compressor(s). More particularly, a first fraction of the high pressure, purified air stream can form the first turbine inlet stream and can be taken from the high pressure, purified air stream as a side-draw from the high pressure heat exchanger, for example, at a temperature of about −20° C. to about −40° C. In one aspect, the first turbine can be a single stage or multi-stage centrifugal expansion turbine with an outlet pressure that is substantially similar to the pressure of the low pressure column of the double column distillation system. Additionally, the expanded part of the first fraction from the high pressure, purified air stream may be introduced into the low pressure column of the dual column distillation system proximate the crude liquid oxygen feed point. According to some aspects, the first turbine flow rate may be about 10% to about 50%, about 15% to about 40%, or about 20% to about 35% of the high pressure, purified air stream. As such, the remaining portion (i.e., a second fraction) of the high pressure, purified air stream may comprise about 50% to about 90%, about 60% to about 85%, or about 65% to about 80% of the total high pressure, purified air stream. The remaining portion (or second fraction) of the high pressure, purified air stream may be cooled in the high pressure heat exchanger against the warming highly purified, high pressure oxygen stream and at least a portion of the waste nitrogen stream. In some aspects, the second fraction of the high pressure, purified air stream may exit the high pressure heat exchanger at a temperature of about −160° C. to about −170° C. In one aspect, the second fraction may be sub-cooled by a further amount of about 5° C. to about 10° C. by passing the second fraction through a heat exchanger that the total waste nitrogen stream traverses. The additional cooling assists in maximizing the proportion of liquid air formed during expansion of the second fraction of the high pressure, pressurized air stream in a second turbine which is specifically designed to expand a high density super-critical low temperature air stream. The second turbine maximizes the proportion of liquid air formed upon expansion by removing internal energy from the second fraction of the high pressure, purified air stream as shaft power. The turbine discharge stream enters the base of the high pressure distillation column, where it becomes part of the total air feed to the high pressure column. Maximizing the proportion of liquid air formed when the second fraction of the high pressure, purified air stream is expanded minimizes the total flow rate of the high pressure, purified air stream and minimizes the amount of power consumed by the high pressure air compressor(s). The flash vapor fraction formed after expansion of the second fraction of the high pressure, purified air stream in the turbine may be less than 2% of the turbine outlet flow rate.

In some aspects, the intermediate pressure, purified air stream from the air compressor(s) at a pressure of about 50 bar to about 80 bar is cooled in the high pressure heat exchanger to a temperature of about −80° C. to about −120° C. against the warming highly purified, high pressure oxygen stream and at least a portion of the waste nitrogen stream. It then enters a third expansion turbine where it is cooled producing work and the outlet stream enters the base of the high pressure column as part of the total feed air stream. The turbine discharge stream of the intermediate pressure, purified air stream may have up to 15% liquid air depending on its inlet pressure and temperature.

The above version of the oxygen plant is suitable for integration with the power system comprising a closed cycle $CO_2$ working fluid when using a natural gas fuel which only requires oxygen for combustion. If a heavy fuel such as coal or heavy oil refining residuals or biomass is to be used as fuel then additional process steps such as carrying out partial oxidation in order to convert them efficiently to gaseous fuel using various gasifier forms which operate at significantly lower pressures than those that may otherwise be required. To produce two separate streams of oxygen from the cryogenic air separation plant at two distinct pressures requires the provision of two separate liquid oxygen pumps. The first major portion is for production of oxygen in the pressure range of 200 bar to 500 bar for use in the combustor of the power generation system. The second minor portion is for the production of oxygen in the pressure range 30 bar to 150 bar for use in a heavy fuel partial oxidation reactor designed to produce a fuel gas stream for ultimate use in the combustor of the power generation system. In this case the two separate high pressure oxygen streams are heated to near ambient temperature in the high pressure heat exchanger and the remaining features of the system are as before with revised optimized process conditions generally within the range of parameters defined above for the single oxygen pressure system.

The arrangement of the two parallel heat exchangers one high pressure and one low pressure, with two high pressure air streams, two gaseous air expansion turbines, a high pressure liquid air expansion turbine and a waste nitrogen heating stream divided between the two heat exchangers gives an optimum heat exchange system which minimizes compressor power.

According to one aspect, a desirable high pressure heat exchanger configured to heat the high pressure oxygen and cool the air may be further configured to withstand pressures of at least 500 bar. In some aspects, the high pressure heat exchanger may be configured to have a sufficiently large specific mass to enable it to withstand a possible ignition of a foreign contaminant in the oxygen passages without catastrophic failure, which may include oxidation of the materials comprising the high pressure heat exchanger. For example, a high pressure heat exchanger may be constructed from a metal that is resistant to combustion in pure oxygen when an ignition source is present. In some aspects, a suitable metal may include stainless steel and/or high nickel alloys. According to another aspect, the high pressure heat exchanger may have a sufficiently large surface area to volume ratio that is typical of compact plate fin heat exchangers. One exemplary high pressure heat exchanger may be supplied by HEATRIC®, Ltd. as described in U.S. Pat. No. 6,360,561, which is incorporated herein in its entirety by reference, specifically for the proposed duty of heating high pressure oxygen streams from cryogenic temperatures to ambient temperatures in a safe and efficient manner. Additionally, one exemplary high pressure heat exchanger may be a be a stainless steel HEATRIC® diffusion bonded compact heat exchanger that includes the safety features described in U.S. Pat. No. 6,360,561. Although some exemplary high pressure heat exchangers described herein are supplied by HEATRIC, Ltd., one of ordinary skill in the art may appreciate that other compact heat exchangers supplied from different vendors may be utilized in various aspects described herein.

Figure 1:
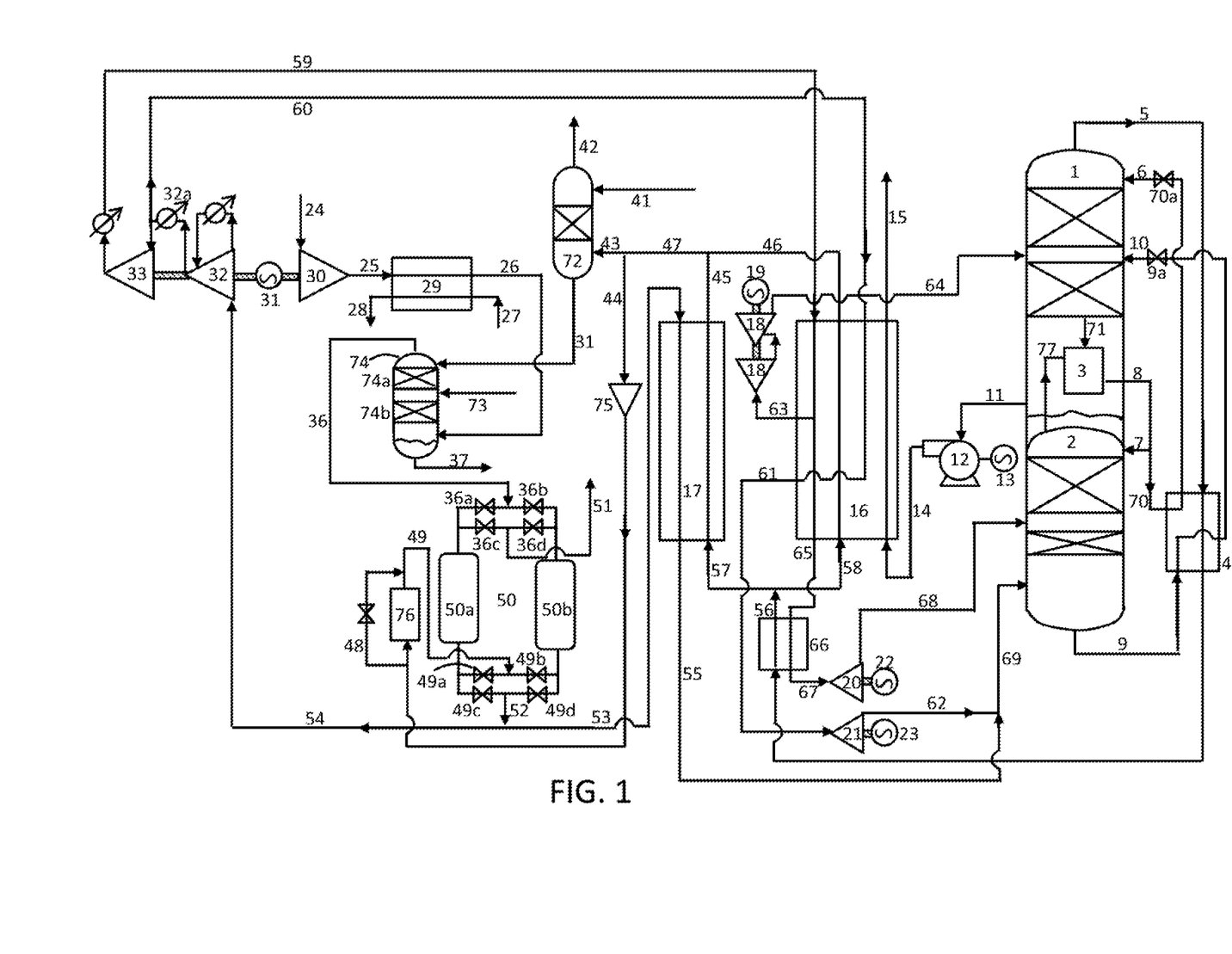
FIG. 1 illustrates a schematic flow diagram of a cryogenic air separation unit configured to produce high pressure oxygen, which may be integrated with a power generation system, according to embodiments of the present disclosure.

An exemplary embodiment of a system and method according to the present disclosure is illustrated in FIG. 1. Although FIG. 1 is described in relation to specific operational parameters, it is understood that the operational parameters are exemplary, and further operation parameters can be encompassed as otherwise described herein. As illustrated in FIG. 1, an inlet air stream 24 may be compressed in an adiabatic axial compressor 30 to a pressure of at least 5.7 bar. The pressure of inlet air stream 24 can be sufficiently low relative to other streams described herein, however, to be considered to be a low pressure air stream. The pressurized inlet air exits the adiabatic axial compressor 30 as stream 25 at a temperature of approximately and/or at least 224° C. and passes through a high pressure heat exchanger 29. The high pressure heat exchanger 29 can be used to heat a variety of streams. In this illustrated embodiment, the high pressure heat exchanger 29 heats an inlet carbon dioxide ($CO_2$) stream 27, which has a pressure of approximately 320 bar and is taken at a temperature of about 50° C. from a $CO_2$ high pressure pump discharge in a $CO_2$ power cycle as otherwise described herein. More particularly, the high pressure heat exchanger 29 heats the inlet $CO_2$ stream 27 to about 221° C., which leaves the high pressure heat exchanger as an outlet $CO_2$ stream 28. This transfers approximately 80% of the adiabatic heat of compression of the air in the main air compressor 30 to the $CO_2$ power cycle to boost the efficiency of the power cycle. Additionally, the heat recovery is converted in the combustion cycle to NET electric power production at over 90% efficiency, which also compensates for the 15% power increase of adiabatic compression compared to conventional inter-cooled air compression. In some aspects, the axial air compressor 30 may provide significant cost savings during installation of the compressor and/or piping when compared to the installation costs of a conventional inter-cooled axial plus centrifugal air compressor. Such cost savings is the case with large (i.e., greater than 1000 MT/day) oxygen plants.

The pressurized air stream 26 leaves the high pressure heat exchanger 29 at a temperature of approximately 55° C. and enters a direct water cooled packed tower 74. The air stream from line 26 is cooled in the direct water cooled packed tower 74 to approximately 8° C. and leaves as a cooled, pressurized air stream in line 36. In particular, the direct water cooled packed tower 74 has two packing sections. A top section 74a of the direct water cooled packed tower 74 is fed by a chilled water stream 31, which is at approximately 7° C. In this exemplified embodiment, chilled water stream 31 is produced by directly contacting an inlet cooling water stream 41 with a waste nitrogen ($N_2$) stream 43 in a packed tower 72. The waste nitrogen stream 43 (which preferably has little or no water content) is provided from a cryogenic air separation plant, and when the waste nitrogen stream contacts the inlet cooling water stream 41 in the packed tower 72, the nitrogen stream is humidified and ejected to the atmosphere as the waste stream 42.

A bottom section 74b of the direct water cooled packed tower 74 further receives a second cooling water inlet stream 73. The bottom section is further configured to pre-cool the air stream 26 so as to approach the temperature of the second cooling water inlet stream 73. This arrangement is particularly useful at high ambient temperatures since the outlet air stream 36 can generally be kept below 15° C. even at ambient temperatures of 35° C. Cooling water leaves the direct water cooled packed tower 74 in stream 37 and can be recycled as desired.

The outlet air stream 36 leaves the direct water cooled packed tower 74 via an efficient water demister section and enters an adsorption system 50 with dual adsorption beds 50a and 50b where carbon dioxide, water, and trace hydrocarbons are removed. The outlet air stream 36 enters the adsorption system 50 through a set of valves 36a, 36b, 36c, 36d. The dual adsorption beds 50a and 50b are operated sequentially and regenerated by nitrogen in stream 44, which passes through a blower 75 such that the pressure of the nitrogen in stream 44 is increased to approximately 1.3 bar. The nitrogen stream 44 is heated for regeneration of the adsorbents in the dual bed adsorption system 50 by the heater 76 to approximately 75° C. The heater 76, according to one aspect, uses at least some waste heat from the $CO_2$ recycle compressor discharge flow. The dual bed adsorption system 50 is cooled with the utilization of a bypass line 48 that circumvents the heater 76.

The regeneration nitrogen stream 49 enters the dual bed adsorption system 50 through a set of valves 49a, 49b, 49c, 49d, counter-concurrent to the outlet air stream 36. Additionally or alternatively, the spent nitrogen is vented to the atmosphere via waste line 51. The air stream 52 leaving the dual bed adsorption system 50 splits into two streams. According to one aspect, a first air stream portion 54 (accounting for approximately 47 mol % of the air stream 52) enters a first air booster inter-cooled multi-stage centrifugal air compressor 32 at a pressure of approximately 5.5 bar and is compressed up to a pressure of approximately 68.9 bar. As discussed above, first air stream portion 54 can comprise about 10 mol % to about 90 mol %, about 25 mol % to about 75 mol %, or about 35 mol % to about 50 mol % of the total air flow leaving the purification system (e.g., the dual bed adsorption system 50).

The first air stream portion 54, after passing through the first air booster inter-cooled multi-stage centrifugal air compressor 32, is cooled in water cooler 32a and is divided. Exit air stream 60 comprises approximately 15.8 mol % of the total air stream 52. Exit air stream 60 can comprise about 30 mol % to about 50 mol % of the air from the first air stream portion 54 and can be at a pressure of about 20 bar to about 90 bar, about 35 bar to about 85 bar, or about 50 to about 80 bar. As such, exit air stream 60 can be considered an intermediate pressure air stream as otherwise defined herein. The remaining approximately 31.2 mol % of the total air stream 52 that was present in the first air stream portion 54 is compressed in a second air booster centrifugal air compressor 33 (e.g., a single centrifugal compressor wheel) to a pressure of approximately 103.4 bar and leaves the second air booster inter-cooled centrifugal air compressor 33 as the cooled air stream 59. Cooled air stream 59 can comprise about 50 mol % to about 70 mol % of the air from the first air stream portion 54 and can be at a pressure of about 70 bar to about 150 bar, about 75 bar to about 140 bar, or about 80 to about 125 bar. As such, cooled air stream 59 can be considered a high pressure air stream as otherwise defined herein. According to one aspect, the first and second air booster centrifugal air compressors 32, 33, together with the main air compressor 30, may be driven by a single electric motor 31.

In some aspects, the pressurized air streams 59, 60, which leave the first and second air booster inter-cooled centrifugal air compressors 33, 32 respectively and comprise approximately 47% of the total air stream 52, enter a high pressure heat exchanger 16. In some aspects, a second air stream portion 53, which includes the remaining 53% of the total air stream 52 and has a pressure of approximately 5.5 bar, enters a low pressure heat exchanger 17. The second air stream portion 53 can comprise, for example, about 10 mol % to about 90 mol %, about 25 mol % to about 75 mol %, or about 40 to about 60 mol % of the total air stream 52. According to one aspect, the high pressure heat exchanger 16 may be a stainless steel or nickel alloy HEATRIC® diffusion bonded compact heat exchanger or the like that is designed with the safety features described in U.S. Pat. No. 6,360,561, while the low pressure heat exchanger 17 may be an aluminum, plate fin unit heat exchanger.

As partially described above, the total air stream 52 is divided, cooled, and partially liquefied to form streams 68, 69 that ultimately enter the base of a high pressure column 2, which may be, in some aspects, a conventional double distillation column traditionally used for production of high purity 99.5% oxygen. The top of the high pressure column 2 is linked to a low pressure column 1 through a re-boiler condenser 3. The high pressure column 2 may thus be a lower column, and the low pressure column 1 may be an upper column. The upper, low pressure column 1 operates at an average pressure of 1.25 bar and separates a crude oxygen feed stream 10 and a reflux nitrogen stream 6 (both of which are received from the lower, high pressure column 2) into a pure oxygen liquid product stream 11 and a waste nitrogen stream 5, which leaves from the top of the low pressure column 1.

The high pressure column 2 provides product gaseous pure nitrogen stream 77, which leaves the top of the high pressure column 2 and condenses in the re-boiler condenser 3. The outlet liquid nitrogen stream 8 is divided into two parts. Stream 7 provides reflux to the high pressure column 2, while stream 70 ultimately becomes stream 6 after passing through valve 70a to provide reflux to the low pressure column 1. The bottom product stream 9 from the high pressure column 2 is a liquid stream containing substantially all of the oxygen in the air feed to the high pressure column 2 provided through streams 68 and 69. According to some aspects, a sub-cooler 4 heats the waste nitrogen stream 5 leaving the low pressure column 1 at its saturation temperature to approximately −174° C. while sub-cooling the crude oxygen outlet stream 9 and the low pressure column reflux liquid nitrogen stream 70. In some aspects, the crude oxygen outlet stream 9 and the low pressure column reflux stream 70 are expanded in pressure let-down valves 9a and 70a, respectively, before passage into the low pressure column 1.

In some aspects, the re-boiler condenser 3 is further configured to use the heat released from the condensing nitrogen to boil a downwardly-flowing liquid oxygen stream 71. The outlet stream of oxygen leaving the open ended base of the re-boiler condenser 3 comprises a mixture of liquid oxygen product which leaves the base of the low pressure column 1 on level control in the sump and a vapor stream which flows up the column counter-currently to the down flowing liquid stream. According to one aspect, the liquid oxygen product stream 11 may be compressed to approximately 325 bar in a multi-stage centrifugal pump 12, which may be driven by an electric motor 13. In some aspects, the removal of liquid oxygen via the new liquid oxygen product stream 11 from the low pressure column 1 requires maintaining a heat balance around the double column system (i.e., the low pressure column 1 and the high pressure column 2). The heat balance is maintained when about 23% of the total air feed (i.e., air streams 68 and 69) entering the high pressure column 2 is liquid air while 77% of the total air feed is air at its saturation temperature of approximately −173° C. at a pressure of approximately 5.38 bar.

The high pressure liquid oxygen product stream 14, which leaves the multi-stage centrifugal pump 12 at a temperature of approximately −167.7° C. and at a pressure of approximately 320 bar, is heated in the high pressure heat exchanger 16. In some aspects, the heated high pressure oxygen product stream 15 leaves the high pressure heat exchanger 16 with a temperature of approximately 18.3° C. For example, the oxygen product stream 15 can be at a temperature of greater than −10° C., greater than 0° C., or greater than 5° C. (e.g., with a maximum of 50° C.). More particularly, the temperature can be about −5° C. to about 50° C., about 0° C. to about 40° C., or about 5° C. to about 30° C.

In some aspects, refrigeration for the air separation process may be substantially provided by the rejection of internal energy in the pressurized air streams in expansion turbines plus the refrigeration produced when the pressurized air streams are reduced in pressure to that of the distillation system. The high pressure air stream 59, which has a pressure of approximately 103.4 bar, is cooled in the high pressure heat exchanger 16 to approximately −29° C. A first fraction 63 of the air stream 59 (which, for example, accounts for approximately 8% of the total air stream 52) is passed through a first expansion turbine 18, which can comprise two centrifugal expansion stages that are serially arranged and which drive an electric generator 19. The turbine discharge stream 64, which has a temperature of approximately −189° C. and a pressure of approximately 1.25 bar, enters the low pressure column 1 approximately proximate to where the crude oxygen feed stream 10 enters the low pressure column. As discussed above, the flow rate through the two centrifugal expansion stages forming the first expansion turbine 18 may be about 10% to about 50%, about 15% to about 40%, or about 20% to about 35% of the air stream 59.

A second fraction 65 of the air stream 59 (which, for example, accounts for approximately 23.2% of the total air stream 52) is cooled to approximately −165° C. in high pressure heat exchanger 16. In some aspects, the second fraction stream 65 is subsequently cooled to approximately −173° C. in a heat exchanger 66. The subsequently cooled portion 67 leaves the heat exchanger 66, which heats the waste nitrogen stream 5 to approximately −169° C. According to some aspects, the heated waste nitrogen stream 56 leaves the heat exchanger 66 and is divided into a first waste nitrogen stream 57 and a second waste nitrogen stream 58. The first waste nitrogen stream 57 comprises approximately 57.8% of the air feed and is heated in the low pressure heat exchanger 17, while the second waste nitrogen stream 58 comprises approximately 21.6% of the air feed and is heated in the high pressure heat exchanger 16. The first waste nitrogen stream 57 exits the low pressure heat exchanger 17 as the first heated waste nitrogen stream 45 at a temperature of approximately 8.8° C., while the second waste nitrogen stream 58 exits the high pressure heat exchanger 16 as the second heated waste nitrogen stream 46 at a temperature of approximately 18.3° C. In one aspect, the first and second heated waste nitrogen streams 45 and 46 may be combined to form the combined heated waste nitrogen stream 47, from which the waste nitrogen stream 43 is drawn for passage to the packed tower 72 and from which nitrogen stream 44 is drawn for passage through blower 75.

The cooled air stream 67 leaving the heat exchanger 66 enters a second expansion turbine 20, which may be configured to drive an electric generator 22. In some aspects, the second expansion turbine 20 may be designed to discharge the inlet air stream 68 at a pressure of approximately 5.4 bar. According to some aspects, the second expansion turbine 20 may include a centrifugal expansion wheel that is configured to operate with high density super-critical pressurized air at the inlet and discharge an inlet air stream 68 that consists of approximately 1% vapor and 99% liquid.

The intermediate pressure air stream 60, which in one aspect may have a pressure of approximately 68.9 bar, enters the high pressure heat exchanger 16 and is cooled to a temperature of approximately −101° C. The outlet high pressure air stream 61 leaves the high pressure heat exchanger 16 and enters a third expansion turbine 21, which drives an electric generator 23. In the third expansion turbine 21, the pressure of the outlet high pressure air stream 61 may be reduced to approximately 5.4 bar. In one aspect, the third expansion turbine discharge stream 62 joins the outlet air stream 55 from the low pressure heat exchanger 17, and the combined air stream 69 enters the base of the high pressure column 2.

The exemplified systems and methods for forming high pressure oxygen are particularly suitable for use with a power production system and method that requires continuous input of high pressure oxygen for fuel combustion. More particularly, power productions systems and methods utilizing a $CO_2$ working fluid stream can be combined with oxygen production systems and method as described herein. As such, the present disclosure further relates to power production cycles that can incorporate a variety of elements and process steps central to the use of a $CO_2$ working fluid. Non-limiting examples of elements and process steps that may be included in a power production cycle according to the present disclosure are described in U.S. Pat. Nos. 8,596,075, 8,776,532, 8,959,887, 8,986,002, 9,068,743, 9,416,728, 9,546,814, U.S. Pat. Pub. No. 2012/0067054, and U.S. Pat. Pub. No. 2013/0213049, the disclosures of which are incorporated herein by reference.

A power production cycle useful as a first power production cycle according to the present disclosure can include any system and method wherein $CO_2$ (particularly supercritical $CO_2$— or $sCO_2$) is used in a work stream. As a non-limiting example, a power production system and method can be configured such that a recycle $CO_2$ stream is provided at high temperature and high pressure, is provided to a combustor wherein a carbonaceous fuel is combusted in oxygen, is expanded across a turbine to produce power, is cooled in a heat exchanger, is purified to remove water and any other impurities, is pressurized, is re-heated using the heat taken from the turbine exhaust, and is again passed to the combustor to repeat the cycle. Such system and method are beneficial in that all fuel and combustion derived impurities, excess $CO_2$, and water are removed as a liquid or a solid (e.g., ash), and there is virtually zero atmospheric emission of any streams. The system and method achieves high efficiency through, for example, the use of low temperature level (i.e., less than 500° C.) heat input after the recycle $CO_2$ stream has been re-pressurized and before combustion.

A power production cycle useful according to the present disclosure can include more steps or fewer steps than described above and can generally include any cycle wherein a high pressure recycle $CO_2$ stream is expanded for power production and recycled again for further power production. As used herein, a high pressure recycle $CO_2$ stream can have a pressure of at least 100 bar, at least 150 bar, at least 200 bar, or at least 300 bar. A high pressure recycle $CO_2$ stream can, in some embodiments, have a pressure of about 100 bar to about 500 bar, about 150 bar to about 450 bar, or about 200 bar to about 400 bar. Reference to a high pressure recycle $CO_2$ stream herein may thus be a $CO_2$ stream at a pressure within the foregoing ranges. Such pressures also apply to references to other high pressure streams described herein, such as a high pressure work stream comprising $CO_2$ or a combustor exhaust stream comprising $CO_2$.

Figure 2:
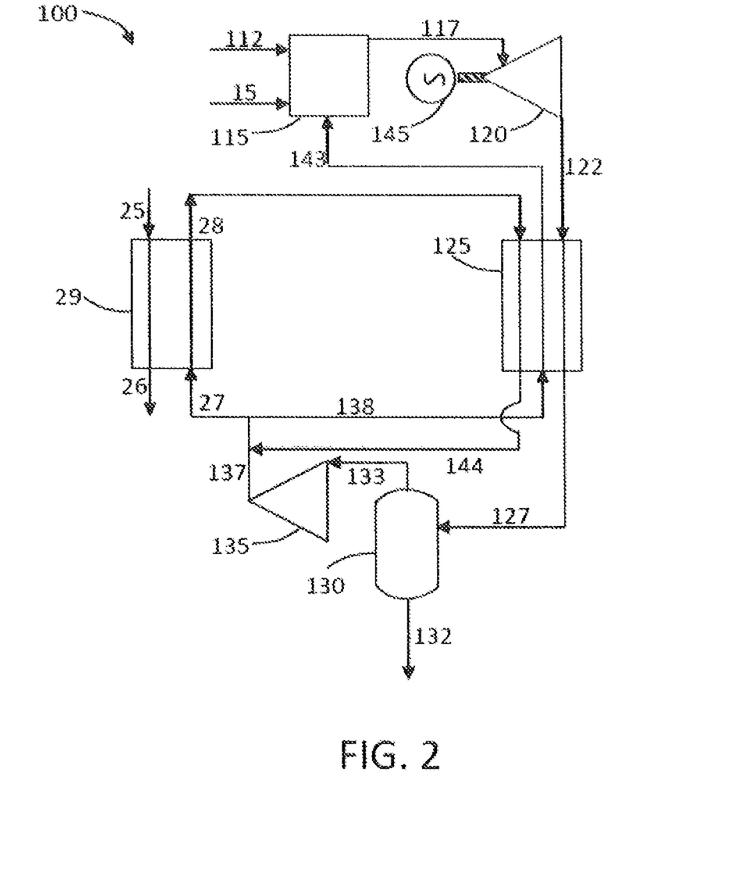
FIG. 2 illustrates a schematic flow diagram of a power production cycle configured for combustion of a fuel in oxygen produced according to embodiments of the present disclosure.

As a non-limiting example, a power production system 100 and method of use thereof is illustrated in FIG. 2. The system 100 includes a combustor 115 where a carbonaceous fuel feed 112 is combusted with high pressure oxygen stream 15 (produced as described herein) in the presence of a recycle $CO_2$ stream 143 to form a high pressure, high temperature combustion product stream 117 that is expanded in a turbine 120 to produce power with a generator 145. The exhaust stream 122 from the turbine 120 at high temperature is cooled in a recuperator heat exchanger 125 to produce a low pressure, low temperature turbine exhaust stream 127 that is passed through a separator 130 with condensed products 132 (e.g., water) and a substantially pure recycle $CO_2$ stream 133 exiting therefrom. The substantially pure recycle $CO_2$ stream 133 is compressed in compressor 135 to form a high pressure recycle $CO_2$ stream 137 that is split into a first portion recycle $CO_2$ stream 138 and a second portion recycle $CO_2$ stream 27. The first portion recycle $CO_2$ stream 138 is passed to the recuperator heat exchanger 125 where it is heated against the cooling turbine exhaust stream 122. The second portion recycle $CO_2$ stream 27 passes through the heat exchanger 29 where it is heated against the pressurized air inlet stream 25 as described above. In this manner, the heat of compression of the air inlet stream 25 is added to the recycled $CO_2$ stream 27 by counter flow through the heat exchanger 29. The heated portion of the recycle $CO_2$ stream 28 is passed through the recuperator heat exchanger 125 to further heat the first portion recycle $CO_2$ stream 138. Although the heated recycled $CO_2$ stream 28 is shown entering the hot end of the recuperator heat exchanger, it is understood that heated recycled $CO_2$ stream 28 may be input to the recuperator heat exchanger 125 at the appropriate heating level based upon the actual temperature of the heated recycled $CO_2$ stream 28. Further, in some embodiments, the heated recycled $CO_2$ stream 28 may not be returned to the recuperator heat exchanger 125. Rather, heated recycled $CO_2$ stream 28 may be input to one or both of recycle $CO_2$ stream 133 and low temperature $CO_2$ stream 127. Although a single recuperator heat exchanger 125 is illustrated, a plurality of recuperator heat exchangers may be used operating at different temperature ranges, and heated recycled $CO_2$ stream 28 may be input to any one or more of said plurality of recuperative heat exchangers.

In other embodiments, the heated recycled $CO_2$ stream 28 may be combined with the first portion recycle $CO_2$ stream 138 prior to entry to the recuperator heat exchanger 142. In such embodiments, for example, further compression may be provided to second portion recycle $CO_2$ stream 27 and/or heated recycled $CO_2$ stream 28.

In still further embodiments, the turbine exhaust stream 142 may pass through a separate heat exchanger (not illustrated in FIG. 1). First portion recycle $CO_2$ stream 138 may be passed through the separate heat exchanger prior to entry to the recuperator heat exchanger. A side stream from the first portion recycle $CO_2$ stream 138 taken during passage through the recuperator heat exchanger at an appropriate heating range may be withdrawn and passed through the separate heat exchanger, and the heated side stream can then be recombined with the first portion recycle $CO_2$ stream 138 at an appropriate heating range. All or a portion of the heated recycle $CO_2$ stream 143 exiting the recuperator heat exchanger 125 may be passed through the separate heat exchanger for further heating. In these exemplary embodiments, the heat provided by the compressed inlet air in stream 25 adds further heating to the first portion recycle $CO_2$ stream 138 beyond the level of heating that is available from the turbine exhaust stream 122 alone. The heated recycle $CO_2$ stream 143 is thereafter input to the combustor 115.

The heated recycled $CO_2$ stream 28 from the heat exchanger 29 is cooled by passage through the recuperative heat exchanger 125 and exits the cold end thereof as recycle $CO_2$ stream 144 which, as illustrated, is recombined with the substantially pure recycle $CO_2$ stream 137 exiting the compressor 135.

The additional heating provided by the heat of compression of the inlet air stream in the oxygen production system as exemplified above can be particularly useful to reduce or eliminate the temperature differential that otherwise exists at the hot end of the recuperator heat exchanger because of the different specific heat capacities of the turbine exhaust entering the recuperator heat exchanger and the recycle $CO_2$ stream exiting the recuperator heat exchanger. Systems and methods as described herein are adapted to achieve such benefit by providing the necessary quantity and quality of heat as the further heating. In particular, the compressor 30 in the oxygen production system can be operated adiabatically (without intercooling) with compression ratio(s) of about 2.5 to 12 or about 2.5 to 10.

Many modifications and other embodiments of the invention will come to mind to one skilled in the art to which this invention pertains having the benefit of the teachings presented in the foregoing descriptions and associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A method of producing power, the method comprising:
combusting a fuel with a stream of substantially pure high pressure oxygen gas in a combustor in the presence of a recycle $CO_2$ working fluid stream to form a combustion product stream including $CO_2$ at a pressure of greater than 150 bar;
expanding the combustion product stream including $CO_2$ across a turbine to form a turbine exhaust stream and generate power;
removing heat from the turbine exhaust stream in a recuperator heat exchanger;
separating $CO_2$ from the turbine exhaust stream to form the recycle $CO_2$ working fluid stream;
compressing the recycle $CO_2$ working fluid stream;
heating at least a first portion of the recycle $CO_2$ working fluid stream using the heat removed from the turbine exhaust stream in the recuperator heat exchanger and also heating at least a second portion of the recycle $CO_2$ working fluid stream using added heating in a second heat exchanger, the heated, second portion of the recycle $CO_2$ working fluid stream being passed through the recuperator heat exchanger to further heat the first portion of the recycle $CO_2$ working fluid stream;
passing the first portion of the recycle $CO_2$ working fluid stream from the recuperator heat exchanger to the combustor; and
forming the stream of substantially pure high pressure oxygen gas by a method wherein:
an inlet air stream is compressed in a first compressor to form a compressed inlet air stream with a pressure of at least 3.5 bar and a temperature of greater than 150° C.;
heat from the compressed inlet air stream is used as the added heating for heating at least the second portion of the recycle $CO_2$ working fluid stream so that the compressed inlet air stream is cooled;
the compressed inlet air stream is purified to form a purified inlet air stream;
the purified inlet air stream is divided into a first portion and a second portion;
the first portion of the purified inlet air stream is compressed to form an intermediate pressure, purified air stream having a pressure of 20 bar to 90 bar and a high pressure, purified air stream having a pressure of 70 bar to 150 bar, the high pressure, purified air stream having a pressure that is greater than the pressure of the intermediate pressure, purified air stream;
the intermediate pressure, purified air stream and the high pressure, purified air stream are cooled in a high pressure heat exchanger;
the second portion of the purified inlet air stream is cooled in a low pressure heat exchanger;
a first fraction of the high pressure, purified air stream is expanded in a first power producing turbine to form a first expanded, purified air stream;
a second fraction of the high pressure, purified air stream is expanded in a second power producing turbine to form a second, expanded, purified air stream;
the intermediate pressure, purified air stream is expanded in a third power producing turbine to form a third expanded, purified air stream;
the first expanded, purified air stream, the second, expanded, purified air stream, the third, expanded, purified air stream, and the second portion of the purified inlet air stream are passed through a distillation column and to form an exit stream of substantially pure liquid oxygen and a waste stream comprising nitrogen;
the exit stream of substantially pure liquid oxygen is compressed to a pressure of greater than 150 bar; and
the exit stream of substantially pure liquid oxygen is heated to a temperature of greater than −10° C. in the high pressure heat exchanger against the intermediate pressure, purified air stream and the high pressure, purified air stream to form the substantially pure high pressure oxygen gas.

2. A method for producing oxygen, the method comprising:
compressing an inlet air stream in a first compressor to form a compressed inlet air stream with a pressure of at least 3.5 bar and a temperature of greater than 150° C.;
cooling the compressed inlet air stream to a temperature of less than 25° C.;
purifying the compressed inlet air stream by removing at least 90 mol % of any carbon dioxide and water present in the compressed inlet air stream and thus forming a purified inlet air stream;
dividing the purified inlet air stream into a first portion and a second portion;
further compressing the first portion of the purified inlet air stream to form an intermediate pressure, purified air stream having a pressure of 20 bar to 90 bar and a high pressure, purified air stream having a pressure of 70 bar to 150 bar, the high pressure, purified air stream having a pressure that is greater than the pressure of the intermediate pressure, purified air stream;
cooling the intermediate pressure, purified air stream and the high pressure, purified air stream in a high pressure heat exchanger;
cooling the second portion of the purified inlet air stream in a low pressure heat exchanger;
expanding a first fraction of the high pressure, purified air stream in a first power producing turbine to form a first expanded, purified air stream;
expanding a second fraction of the high pressure, purified air stream in a second power producing turbine to form a second, expanded, purified air stream;
expanding the intermediate pressure, purified air stream in a third power producing turbine to form a third expanded, purified air stream;
passing the first expanded, purified air stream, the second, expanded, purified air stream, the third, expanded, purified air stream, and the second portion of the purified inlet air stream through a distillation column and to form an exit stream of substantially pure liquid oxygen and a waste stream comprising nitrogen;
compressing the exit stream of substantially pure liquid oxygen to a pressure of greater than 150 bar; and
heating the exit stream of substantially pure liquid oxygen to a temperature of greater than −10° C. in the high pressure heat exchanger against the intermediate pressure, purified air stream and the high pressure, purified air stream to form an exit stream of substantially pure high pressure oxygen gas.

3. The method of claim 2, wherein the purifying comprises passing the compressed inlet air stream through a dual bed adsorption system.

4. The method of claim 2, wherein the first portion of the purified inlet air stream comprises 25 mol % to 75 mol % of the purified inlet air stream.

5. The method of claim 2, wherein the intermediate pressure, purified air stream comprises 30 mol % to 50 mol % of the first portion of the purified inlet air stream, and the high pressure, purified air stream comprises 70 mol % to 50 mol % of the first portion of the purified inlet air stream.

6. The method of claim 2, comprising cooling the second portion of the purified inlet air stream against a portion of the waste stream comprising nitrogen before passing the second portion of the purified inlet air stream through the distillation column.

7. The method of claim 2, wherein the first fraction of the high pressure, purified air stream to be expanded in the first power producing turbine is withdrawn from the high pressure heat exchanger at a temperature range of −20 to −40° C.

8. The method of claim 2, wherein the second fraction of the high pressure, purified air stream to be expanded in the second power producing turbine is withdrawn from the high pressure heat exchanger at a temperature range of −160 to −170° C.

9. The method of claim 2, wherein the intermediate pressure, purified air stream to be expanded in the third power producing turbine is withdrawn from the heat exchanger at a temperature range of −80 to −120° C.

10. The method of claim 2, wherein the distillation column comprises a double column distillation system.

11. The method of claim 2, wherein the exit stream of substantially pure liquid oxygen is compressed to a pressure of 200 bar to 500 bar.

12. The method of claim 2, wherein cooling the compressed inlet air stream comprises transferring heat from the compressed inlet air stream to a working fluid stream from a power producing cycle.

13. The method of claim 12, comprising cooling the compressed inlet air stream to a first reduced temperature by transferring heat from the compressed inlet air stream to the working fluid stream from the power producing cycle, and comprising cooling the compressed inlet air stream to a second, further reduced temperature against a cooling water stream.

* * * * *